Patented Dec. 26, 1939

2,184,271

UNITED STATES PATENT OFFICE 2,184,271

MOLDABLE MATERIAL AND PROCESS OF FORMING SAME

Henry Seymour Colton, Shaker Heights, Ohio, assignor to H. Seymour Colton, M. J. Rentschler and James A. Weeks, as trustees No Drawing. Application May 21, 1938, Serial No. 209,357

12 Claims. (Cl. 106—27)

This invention relates to improvements in moldable material and the process of forming the same. In some of its aspects the invention constitutes an improvement over my copending application Serial No. 196,491, filed March 17, 1938. It is particularly useful in the reclamation of waste materials containing iron sulphate, as, for example, waste sulphuric acid pickle liquor, large quantities of which are accumulated in the manufacture of steel and steel products. Another such waste material is copperas produced as a by-product in the manufacture of the white pigment, titanium oxide. Copperas and uncrystallized ferrous sulphate have some uses in the arts, but their production as by-products greatly exceeds the present demand, and the disposition of the excess amount has become a major problem, for the dumping of this material into streams kills animal and vegetable life and the authorities are becoming quite insistent that such disposition of it is a nuisance and must be stopped. Waste sulphuric acid pickle liquor is further objectionable because of its content of from 2% to 8% sulphuric acid.

In accordance with the invention covered by my prior application above referred to ferrous sulphate, and, in the case of pickle liquor, ferrous sulphate and sulphuric acid are combined with an alkaline calcium compound, such as slaked lime, in quantities sufficient to combine with all of the ferrous sulphate in the one case or all of the ferrous sulphate and sulphuric acid in the other case, so as to precipitate calcium sulphate and iron hydroxide, and this precipitate when mixed with a filler may be molded or otherwise compacted and dried to form useful objects.

When the magma is first formed, the hydroxide is in the ferrous state. Being precipitated simultaneously with the sulphate the mixture therewith is a very intimate one. As the material dries, oxidation converts the hydroxide into the ferric state with a change of color from green to brown. The ferric hydroxide is a highly effective binder, and I believe is responsible to a considerable extent for the strength and hardness of the objects formed from my composition.

I have now discovered that more desirable properties, such as more plasticity, greater strength, smoother finish, and less susceptibility to water, may be imparted to the objects made by my process if at least one additional hydroxide is precipitated simultaneously with the iron hydroxide. It is my belief that this improved product is due to the fact that the particles of the various hydroxides are of different size, so that they intermesh and interlock with each other making the mass stronger and more impervious, the action being analogous to that which takes place in the formation of concrete where the aggregate is made up of particles of different size. I have found that the lighter hydroxides, such as magnesium hydroxide, have less strength than the heavier ones such as those of iron and chromium, and if large percentages of the lighter hydroxides are precipitated with the iron hydroxide, they act as diluents and the resulting mixture, while much lighter, may not be as strong as the iron hydroxide alone. The two hydroxides intimately mixed by coprecipitation however are much stronger than the two component hydroxides separately.

I have found that the particle size of aluminum hydroxide is such that the objects made with about 10% of this hydroxide to 90% of iron hydroxide take on a fine wax-like polish when rubbed. A mixture of aluminum and magnesium hydroxides with calcium sulphate gives a very light product, but due to the low strength of its components, this product is not as strong as a similar product comprising one of these hydroxides precipitated with iron hydroxide.

In order to secure the best results, the added hydroxide should be precipitated coincidentally with the iron hydroxide. In most cases this may be accomplished by first forming a soluble sulphate in the solution, that is before the lime is added. Where it is desired to form aluminum sulphate, for example, bauxite may be added to the pickle liquor. The sulphuric acid which is present combines with the bauxite as per the following equation:

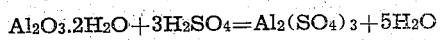

$$Al_2O_3.2H_2O + 3H_2SO_4 = Al_2(SO_4)_3 + 5H_2O$$

Where no sulphuric acid is mixed with the ferrous sulphate a small quantity of acid may be added before the bauxite is put into the solution, or a solution of aluminum sulphate may be made up separately and added to the ferrous sulphate solution. Then the solution containing the two sulphates of iron and aluminum may have added thereto an alkaline calcium compound, such as milk of lime, with the reaction as follows:

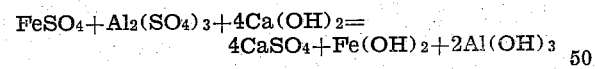

$$FeSO_4 + Al_2(SO_4)_3 + 4Ca(OH)_2 = 4CaSO_4 + Fe(OH)_2 + 2Al(OH)_3$$

The process is somewhat simplified where calcined dolomite is used instead of lime, for the dolomite being a double carbonate of calcium and magnesium, and when calcined being a double oxide of those metals, supplies the extra hydroxide simultaneously with the formation of iron hydroxide. The equation may be written:

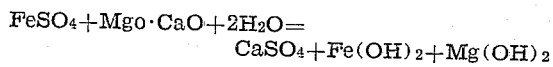

$$FeSO_4 + MgO \cdot CaO + 2H_2O = CaSO_4 + Fe(OH)_2 + Mg(OH)_2$$

While at the present time I prefer to employ bauxite or dolomite in the manner above described, other materials may be used in conjunction with lime or the like, examples of such materials being the mineral illmenite, which is a double oxide of iron and titanium, or the mineral chromite which is a double oxide of iron and chromium.

I have found that the composition may be improved, particularly with respect to plasticity for molding, and imperviousness to moisture in the molded and hardened articles, by including calcium hydroxide as a constituent of the mix after the chemical reactions have been completed. The only practicable way to add the calcium hydroxide is as freshly made milk of lime, as it cannot be readily precipitated in situ, as is the case with the other hydroxides. This is accomplished in some cases by merely adding calcium hydroxide in excess in that step of the process which is covered by the second equation given above. In other cases the final mix may include the hydroxides of iron and calcium only, in which event the single equation may be written as follows:

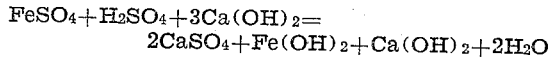

$$FeSO_4 + H_2SO_4 + 3Ca(OH)_2 = 2CaSO_4 + Fe(OH)_2 + Ca(OH)_2 + 2H_2O$$

In either event the mix should be thoroughly agitated in order to intimately commingle the calcium hydroxide with the other ingredients.

Having thus described my invention, I claim:

1. A composition of matter adapted for formation into useful products by molding, extrusion or the like, which comprises a joint precipitate of calcium sulphate and iron hydroxide with another insoluble hydroxide, in the proportions by weight substantially of three parts sulphate to two parts hydroxides.

2. A composition of matter adapted for formation into useful products by molding, extrusion or the like, which comprises a filler, calcium sulphate, and precipitated iron hydroxide with another insoluble hydroxide, in the proportions by weight substantially of three parts sulphate to two part hydroxides.

3. A composition of matter adapted for formation into useful products by molding, extrusion or the like, comprising a joint precipitate of calcium sulphate, iron hydroxide and aluminum hydroxide, in the proportions by weight substantially of three parts sulphate to two parts hydroxides.

4. A composition of matter adapted for formation into useful products by molding, extrusion or the like, comprising calcium sulphate, iron hydroxide and aluminum hydroxide, the sulphate approximating one and one-half times the weight of the hydroxides and the relative proportions by weight of the hydroxides being substantially 90% iron hydroxide and 10% aluminum hydroxide.

5. A composition of matter adapted for formation into useful products by molding, extrusion or the like, comprising substantially the following proportions by weight: calcium sulphate 60%, ferrous hydroxide 36% and aluminum hydroxide 4%.

6. A composition of matter adapted for formation into useful products by molding, extrusion or the like, comprising coprecipitated calcium sulphate, iron hydroxide and magnesium hydroxide, in the proportions by weight substantially of three parts sulphate to two parts hydroxides.

7. A composition of matter adapted for formation into useful products by molding or the like, comprising a joint precipitate of calcium sulphate and iron hydroxide intimately commingled with calcium hydroxide, in the proportions by weight substantially of three parts sulphate to two parts hydroxides.

8. A formed and rigid composition of matter, comprising a joint precipitate of calcium sulphate and iron hydroxide with another insoluble hydroxide, in the proportions by weight substantially of three parts sulphate to two parts hydroxides.

9. The process of forming a moldable material from waste material containing ferrous sulphate and with which a small proportion of sulphuric acid is mixed, which comprises adding to the solution a compound of a metal whose hydroxide is insoluble to combine with the sulphuric acid present to form a soluble sulphate, and mixing with the solution an alkaline calcium compound in proportions sufficient to combine with all of the acid and ferrous sulphate to precipitate simultaneously calcium sulphate and the hydroxides of said last named metal and iron.

10. The process of forming a moldable material from waste material containing ferrous sulphate with which a small proportion of sulphuric acid is mixed, which comprises adding bauxite and an alkaline calcium compound, the latter in proportions sufficient to combine with all of the acid and ferrous sulphate present to precipitate simultaneously calcium sulphate and the hydroxides of iron and aluminum.

11. The process of forming a moldable material from waste sulphuric acid iron pickle liquor, which comprises adding calcined dolomite to the solution in proportions sufficient to combine with all of the acid and ferrous sulphate of the liquor to precipitate simultaneously calcium sulphate and the hydroxides of iron and magnesium.

12. The process of forming a moldable material from waste material containing ferrous sulphate, which comprises adding a small proportion of aluminum sulphate, agitating the mixture, and then adding an alkaline calcium compound in proportions to combine with all of the ferrous sulphate and aluminum sulphate present to precipitate simultaneously calcium sulphate and the hydroxides of aluminum and iron.

HENRY SEYMOUR COLTON.